(12) United States Patent
    Esswie

(10) Patent No.:    US 12,672,138 B2
(45) Date of Patent:        Jun. 30, 2026

(54) PACKET-DISCARDING-AWARE CONFIGURED GRANT PATTERN ADAPTATION

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice:    Subject to any disclaimer, the term of this patent is extended or adjusted under 35 U.S.C. 154(b) by 332 days.

(21) Appl. No.: 18/434,244

(22) Filed:    Feb. 6, 2024

(65)    Prior Publication Data

US 2025/0254686 A1      Aug. 7, 2025

(51) Int. Cl.
    *H04W 72/1273*    (2023.01)
    *H04L 5/00*    (2006.01)
    *H04W 24/10*    (2009.01)
(52) U.S. Cl.
    CPC ....... *H04W 72/1273* (2013.01); *H04L 5/0048* (2013.01); *H04W 24/10* (2013.01)
(58) Field of Classification Search
    CPC . H04W 72/1273; H04W 24/10; H04W 72/23; H04W 72/115; H04L 5/0048
    See application file for complete search history.

(56)    References Cited

U.S. PATENT DOCUMENTS

2016/0302075 A1*    10/2016    Dudda .................. H04L 63/123
2022/0014944 A1*    1/2022    Liang ................... H04W 24/04

OTHER PUBLICATIONS

"3rd Generation Partnership Project; Technical Specification Group Services and System Aspects; Release 17 Description; Summary of Rel-17 Work Items (Release 17)" 3GPP TR 21.917, V17.0.1, Jan. 2023, 167 pages.

* cited by examiner

*Primary Examiner* — Fred A Casca
(74) *Attorney, Agent, or Firm* — Amin, Turocy & Watson, LLP

(57)    ABSTRACT

A radio network node configures an extended reality processing unit with a packet skipping reporting criterion and a resource pattern indicative of resources, shareable among extended reality appliances, to facilitate delivery to the node of traffic associated with the appliances. The processing unit determines that one or more of the appliances has failed to transmit, according to the resource pattern, a number of traffic packets that satisfies the reporting criterion. Satisfaction of the reporting criterion triggers transmission of a packet skipping report to the node. Based on a number of appliances, indicated in the report, corresponding to satisfaction of the reporting criterion, the node updates a report count indicative of appliances with respect to which reporting corresponding to the pattern has been transmitted and indicates to the processing unit a different resources pattern, corresponding to a lower report count, to facilitate delivery of traffic with respect to the appliances.

20 Claims, 14 Drawing Sheets

330

Skipping report

End XR device/appliance ID $x_1$ — 410A

.

End XR device/appliance ID $x_n$ — 410n

CG scheduling and PDU skipping information

| CG resource pattern | Number of PDU skipping threshold violations |
|---|---|
| CG pattern $y_1$ (current) | 10 |
| ⋮ | ⋮ |
| CG pattern $y_z$ | 11 |

Updated CG scheduling and PDU skipping information

| CG resource pattern | Number of PDU skipping threshold violations |
|---|---|
| CG pattern $y_1$ | 12 |
| ⋮ | ⋮ |
| CG pattern $y_z$ (current) | 11 |

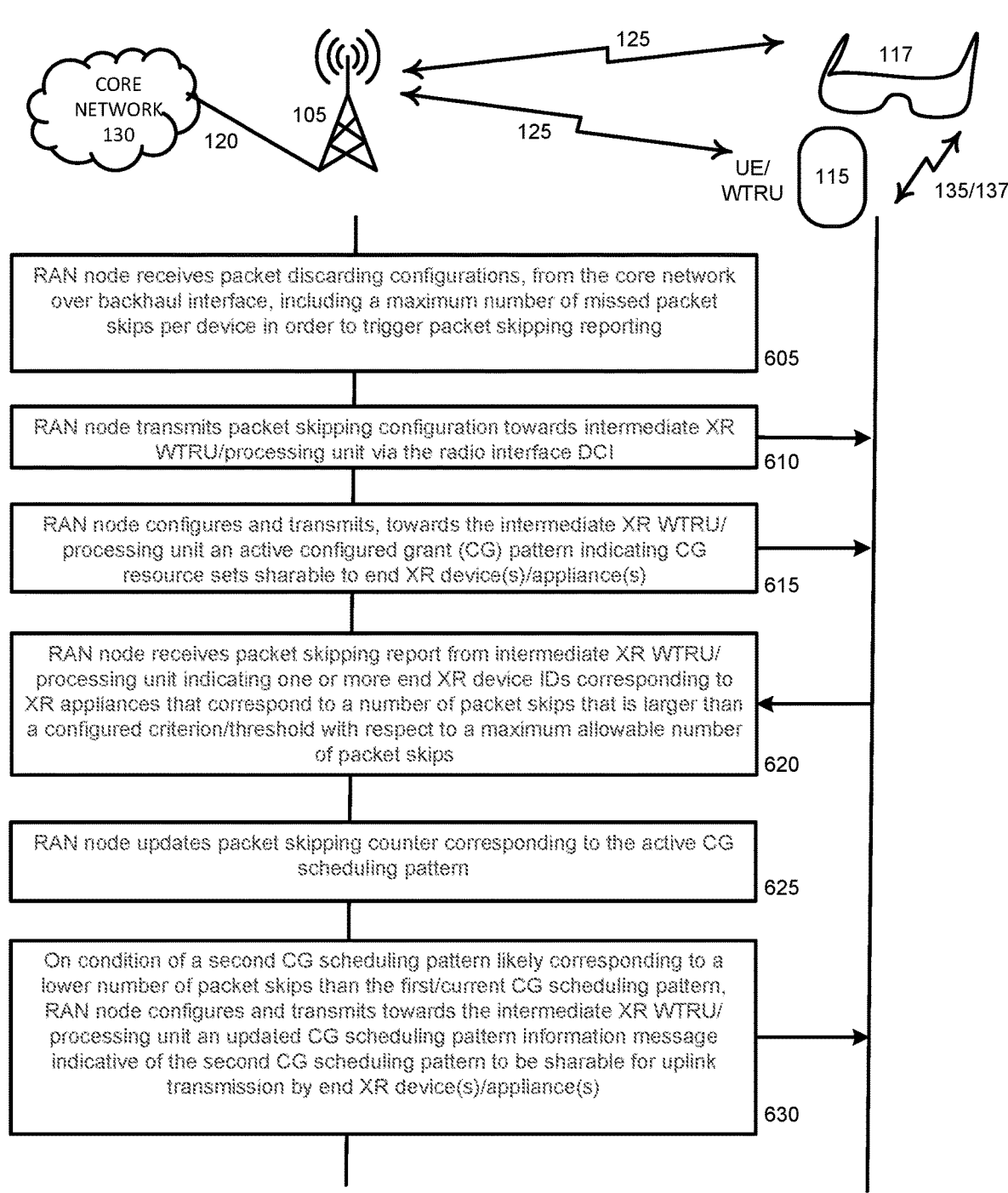

RAN node receives packet discarding configurations, from the core network over backhaul interface, including a maximum number of missed packet skips per device in order to trigger packet skipping reporting

605

RAN node transmits packet skipping configuration towards intermediate XR WTRU/processing unit via the radio interface DCI

610

RAN node configures and transmits, towards the intermediate XR WTRU/ processing unit an active configured grant (CG) pattern indicating CG resource sets sharable to end XR device(s)/appliance(s)

615

RAN node receives packet skipping report from intermediate XR WTRU/ processing unit indicating one or more end XR device IDs corresponding to XR appliances that correspond to a number of packet skips that is larger than a configured criterion/threshold with respect to a maximum allowable number of packet skips

620

RAN node updates packet skipping counter corresponding to the active CG scheduling pattern

625

On condition of a second CG scheduling pattern likely corresponding to a lower number of packet skips than the first/current CG scheduling pattern, RAN node configures and transmits towards the intermediate XR WTRU/ processing unit an updated CG scheduling pattern information message indicative of the second CG scheduling pattern to be sharable for uplink transmission by end XR device(s)/appliance(s)

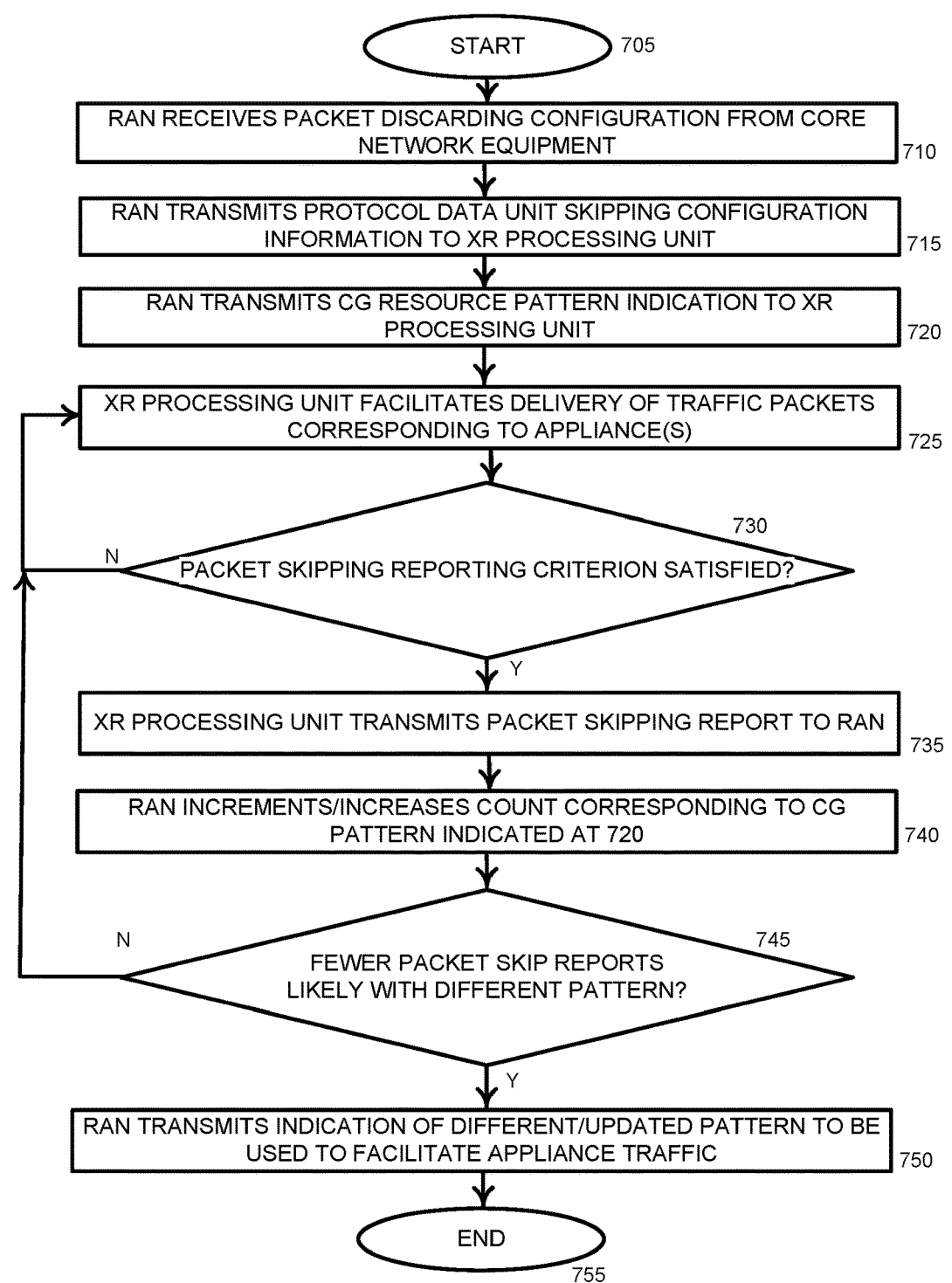

START 705

RAN RECEIVES PACKET DISCARDING CONFIGURATION FROM CORE NETWORK EQUIPMENT 710

RAN TRANSMITS PROTOCOL DATA UNIT SKIPPING CONFIGURATION INFORMATION TO XR PROCESSING UNIT 715

RAN TRANSMITS CG RESOURCE PATTERN INDICATION TO XR PROCESSING UNIT 720

XR PROCESSING UNIT FACILITATES DELIVERY OF TRAFFIC PACKETS CORRESPONDING TO APPLIANCE(S) 725

PACKET SKIPPING REPORTING CRITERION SATISFIED? 730     N     Y

XR PROCESSING UNIT TRANSMITS PACKET SKIPPING REPORT TO RAN 735

RAN INCREMENTS/INCREASES COUNT CORRESPONDING TO CG PATTERN INDICATED AT 720 740

FEWER PACKET SKIP REPORTS LIKELY WITH DIFFERENT PATTERN? 745     N     Y

RAN TRANSMITS INDICATION OF DIFFERENT/UPDATED PATTERN TO BE USED TO FACILITATE APPLIANCE TRAFFIC 750

END 755

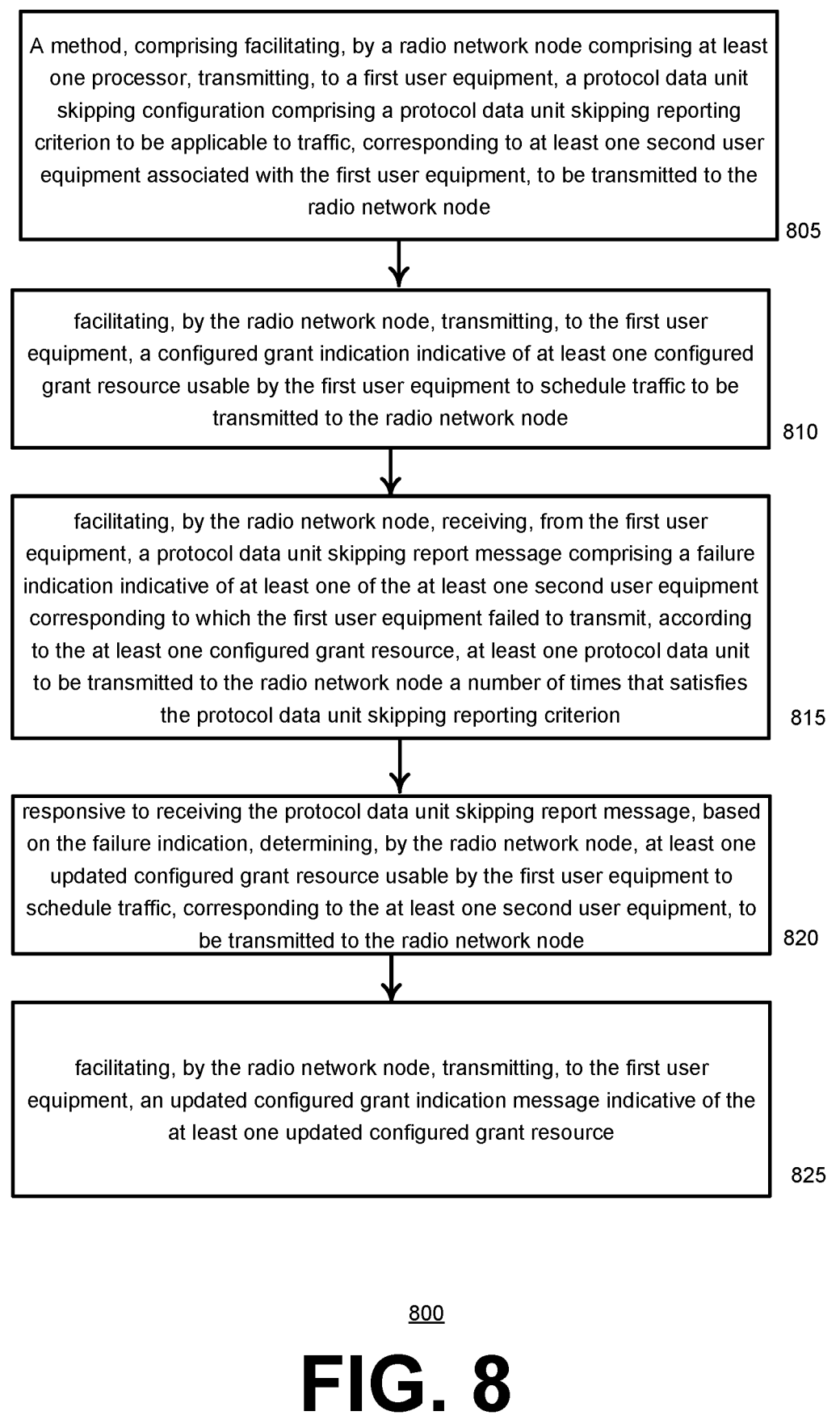

A method, comprising facilitating, by a radio network node comprising at least one processor, transmitting, to a first user equipment, a protocol data unit skipping configuration comprising a protocol data unit skipping reporting criterion to be applicable to traffic, corresponding to at least one second user equipment associated with the first user equipment, to be transmitted to the radio network node
<div align="right">805</div>

↓ facilitating, by the radio network node, transmitting, to the first user equipment, a configured grant indication indicative of at least one configured grant resource usable by the first user equipment to schedule traffic to be transmitted to the radio network node
<div align="right">810</div>

↓ facilitating, by the radio network node, receiving, from the first user equipment, a protocol data unit skipping report message comprising a failure indication indicative of at least one of the at least one second user equipment corresponding to which the first user equipment failed to transmit, according to the at least one configured grant resource, at least one protocol data unit to be transmitted to the radio network node a number of times that satisfies the protocol data unit skipping reporting criterion
<div align="right">815</div>

↓ responsive to receiving the protocol data unit skipping report message, based on the failure indication, determining, by the radio network node, at least one updated configured grant resource usable by the first user equipment to schedule traffic, corresponding to the at least one second user equipment, to be transmitted to the radio network node
<div align="right">820</div>

↓ facilitating, by the radio network node, transmitting, to the first user equipment, an updated configured grant indication message indicative of the at least one updated configured grant resource
<div align="right">825</div>

<div align="center">800</div>

FIG. 8

Figure 9:
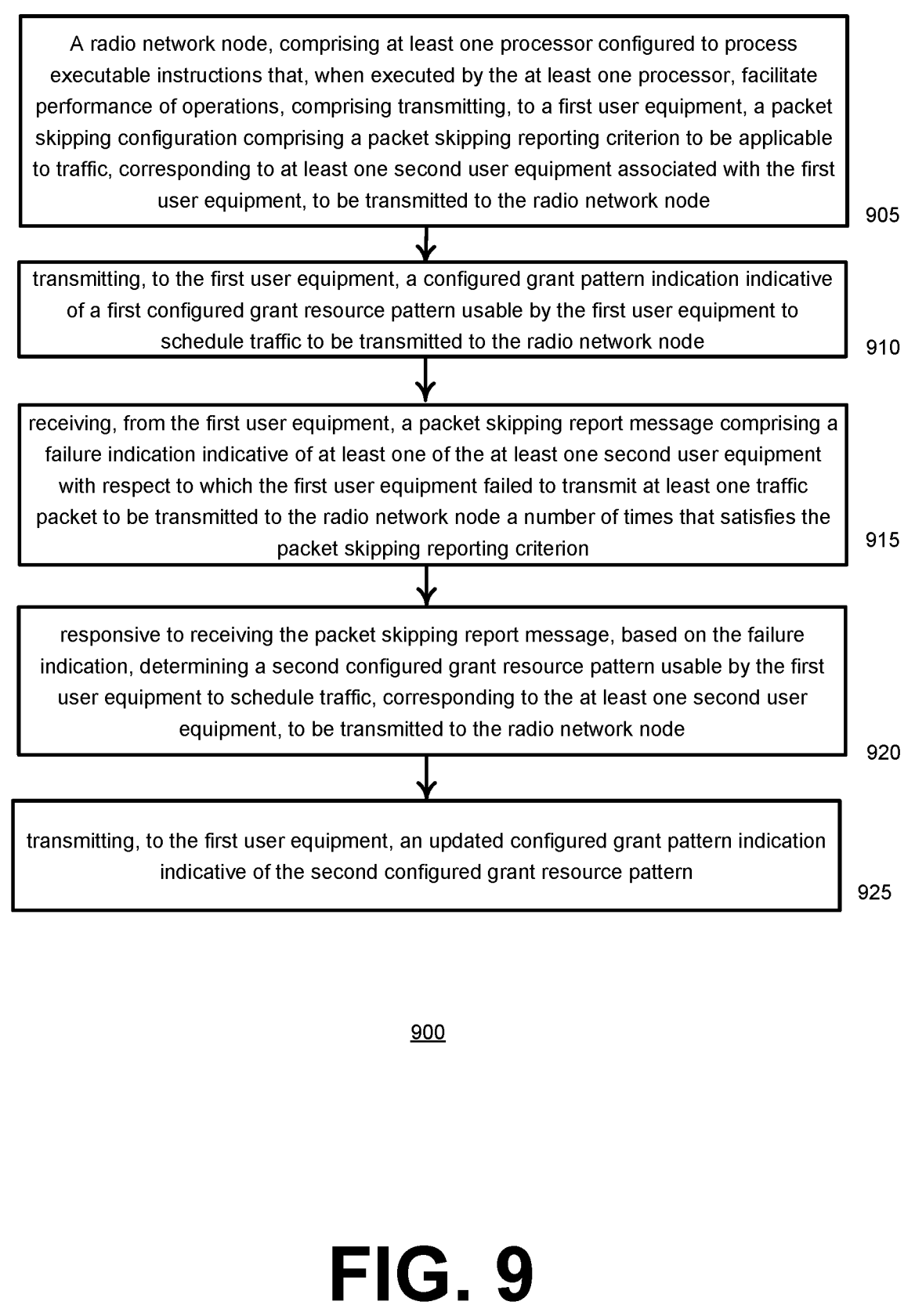

A radio network node, comprising at least one processor configured to process executable instructions that, when executed by the at least one processor, facilitate performance of operations, comprising transmitting, to a first user equipment, a packet skipping configuration comprising a packet skipping reporting criterion to be applicable to traffic, corresponding to at least one second user equipment associated with the first user equipment, to be transmitted to the radio network node

905 transmitting, to the first user equipment, a configured grant pattern indication indicative of a first configured grant resource pattern usable by the first user equipment to schedule traffic to be transmitted to the radio network node

910 receiving, from the first user equipment, a packet skipping report message comprising a failure indication indicative of at least one of the at least one second user equipment with respect to which the first user equipment failed to transmit at least one traffic packet to be transmitted to the radio network node a number of times that satisfies the packet skipping reporting criterion

915 responsive to receiving the packet skipping report message, based on the failure indication, determining a second configured grant resource pattern usable by the first user equipment to schedule traffic, corresponding to the at least one second user equipment, to be transmitted to the radio network node

920 transmitting, to the first user equipment, an updated configured grant pattern indication indicative of the second configured grant resource pattern

Figure 10:
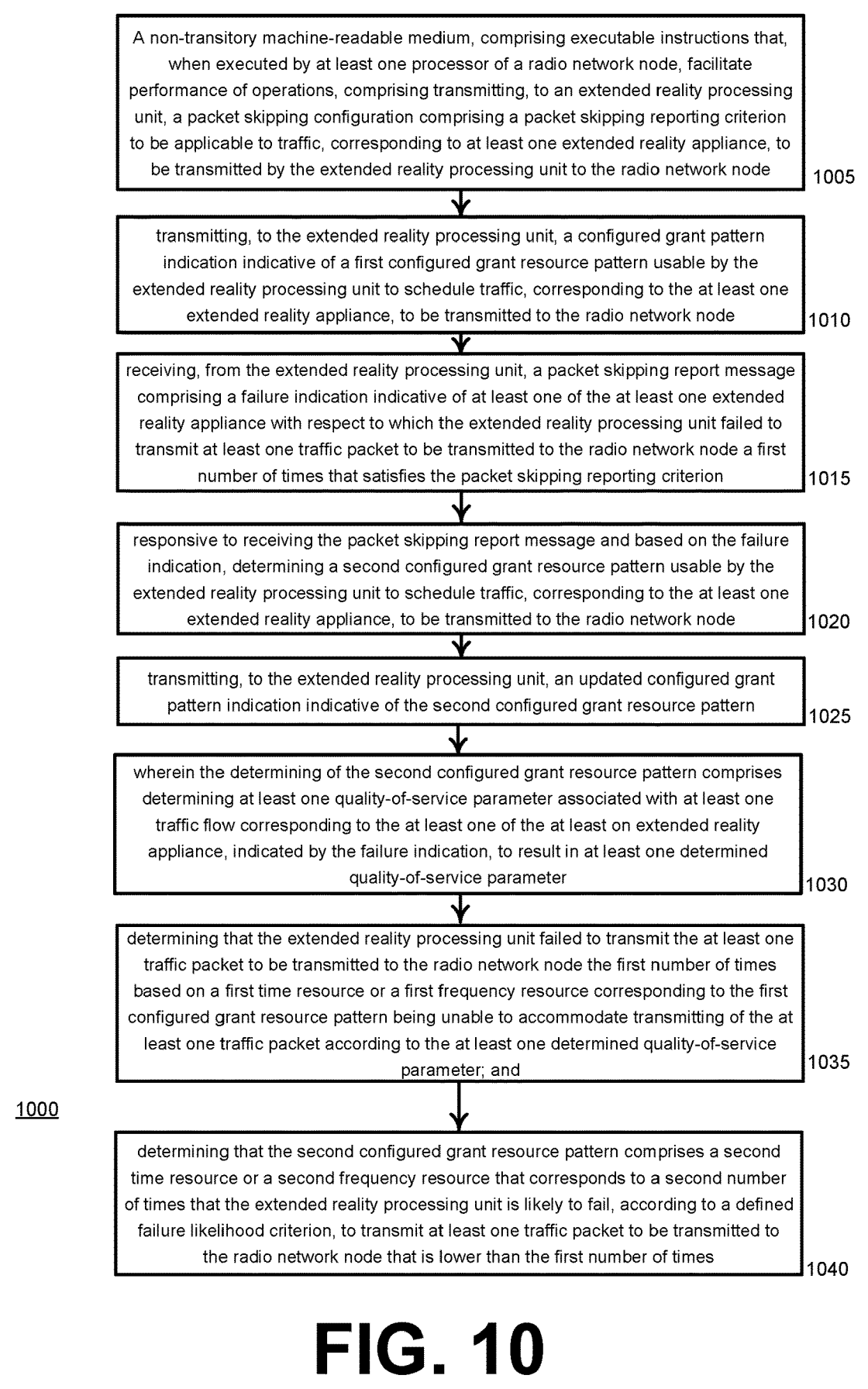

A non-transitory machine-readable medium, comprising executable instructions that, when executed by at least one processor of a radio network node, facilitate performance of operations, comprising transmitting, to an extended reality processing unit, a packet skipping configuration comprising a packet skipping reporting criterion to be applicable to traffic, corresponding to at least one extended reality appliance, to be transmitted by the extended reality processing unit to the radio network node

1005 transmitting, to the extended reality processing unit, a configured grant pattern indication indicative of a first configured grant resource pattern usable by the extended reality processing unit to schedule traffic, corresponding to the at least one extended reality appliance, to be transmitted to the radio network node

1010 receiving, from the extended reality processing unit, a packet skipping report message comprising a failure indication indicative of at least one of the at least one extended reality appliance with respect to which the extended reality processing unit failed to transmit at least one traffic packet to be transmitted to the radio network node a first number of times that satisfies the packet skipping reporting criterion

1015 responsive to receiving the packet skipping report message and based on the failure indication, determining a second configured grant resource pattern usable by the extended reality processing unit to schedule traffic, corresponding to the at least one extended reality appliance, to be transmitted to the radio network node

1020 transmitting, to the extended reality processing unit, an updated configured grant pattern indication indicative of the second configured grant resource pattern

1025 wherein the determining of the second configured grant resource pattern comprises determining at least one quality-of-service parameter associated with at least one traffic flow corresponding to the at least one of the at least on extended reality appliance, indicated by the failure indication, to result in at least one determined quality-of-service parameter

1030 determining that the extended reality processing unit failed to transmit the at least one traffic packet to be transmitted to the radio network node the first number of times based on a first time resource or a first frequency resource corresponding to the first configured grant resource pattern being unable to accommodate transmitting of the at least one traffic packet according to the at least one determined quality-of-service parameter; and

1035

1000 determining that the second configured grant resource pattern comprises a second time resource or a second frequency resource that corresponds to a second number of times that the extended reality processing unit is likely to fail, according to a defined failure likelihood criterion, to transmit at least one traffic packet to be transmitted to the radio network node that is lower than the first number of times

PACKET-DISCARDING-AWARE CONFIGURED GRANT PATTERN ADAPTATION

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio network node comprising at least one processor, transmitting, to a first user equipment, a protocol data unit skipping configuration comprising a protocol data unit skipping reporting criterion to be applicable to traffic, corresponding to at least one second user equipment associated with the first user equipment, to be transmitted to the radio network node. The method may further comprise facilitating, by the radio network node, transmitting, to the first user equipment, a configured grant indication indicative of at least one configured grant resource usable by the first user equipment to schedule traffic to be transmitted to the radio network node. The method may further comprise facilitating, by the radio network node, receiving, from the first user equipment, a protocol data unit skipping report message comprising a failure indication indicative of at least one of the at least one second user equipment corresponding to which the first user equipment failed to transmit, according to the at least one configured grant resource, at least one protocol data unit to be transmitted to the radio network node a number of times that satisfies the protocol data unit skipping reporting criterion. Responsive to receiving the protocol data unit skipping report message, based on the failure indication, the method may further comprise determining, by the radio network node, at least one updated configured grant resource usable by the first user equipment to schedule traffic, corresponding to the at least one second user equipment, to be transmitted to the radio network node, and facilitating, by the radio network node, transmitting, to the first user equipment, an updated configured grant indication message indicative of the at least one updated configured grant resource.

The at least one configured grant resource may be at least one first configured grant resource and may comprise a first configured grant resource pattern. The at least one updated configured grant resource may be at least one second configured grant resource and comprises a second configured grant resource pattern.

The at least one configured grant resource and the at least one second configured grant resource may be sharable by the first user equipment with respect to the at least one second user equipment.

In an embodiment, the protocol data unit skipping reporting criterion may be a protocol data unit skipping reporting criterion value. The updated configured grant indication message may comprise an updated protocol data unit skipping reporting criterion that is to be applicable to traffic, corresponding to the at least one second user equipment, to be transmitted to the radio network node.

The protocol data unit skipping reporting criterion may be a current protocol data unit skipping reporting criterion and may comprise a current protocol data unit skipping threshold value. The updated protocol data unit skipping reporting criterion may comprise an updated protocol data unit skipping threshold value. The updated protocol data unit skipping threshold value may be higher than the current protocol data unit skipping threshold value.

In an embodiment, the protocol data unit skipping reporting criterion may be a first protocol data unit skipping reporting criterion. The at least one configured grant resource may be at least one first configured grant resource. The protocol data unit skipping report message may be a first protocol data unit skipping report message. The failure indication may be a first failure indication. The updated configured grant indication message may be a first updated configured grant indication message. The at least one updated configured grant resource may be at least one first updated configured grant resource. The at least one first updated configured grant resource may be at least one second configured grant resource. The method may further comprise facilitating, by the radio network node, receiving, from the first user equipment, a second protocol data unit skipping report message comprising a second failure indication indicative of at least one of the at least one second user equipment corresponding to which the first user equipment failed to transmit, according to the at least one first updated configured grant resource, at least one protocol data unit to be transmitted to the radio network node a number of times that satisfies the updated protocol data unit skipping reporting criterion. Responsive to receiving the protocol data unit skipping report message, based on the second failure indication, the method may further comprise determining, by the radio network node, at least one third configured grant resource usable by the first user equipment to schedule traffic, corresponding to the at least one second user equipment, to be transmitted to the radio network node. The method may further comprise facilitating, by the radio network node, transmitting, to the first user equipment, a second updated configured grant indication message indicative of the at least one third configured grant resource.

The updated protocol data unit skipping reporting criterion may be a second protocol data unit skipping reporting criterion. The at least one third configured grant resource may be the same as the at least one first configured grant resource or the at least one second configured grant resource. The at least one third configured grant resource may be associated in the second updated configured grant indication message with a third protocol data unit skipping reporting criterion that is different than the first protocol data unit skipping reporting criterion or the second protocol data unit skipping reporting criterion.

In an embodiment, the first user equipment may be configured to facilitate extended reality processing unit functionality with respect to the at least one second user equipment. The at least one second user equipment may comprise an extended reality appliance.

In an embodiment, the at least one second user equipment may comprise more than one second user equipment. The traffic to be transmitted may be able to comprise traffic from, or may comprise traffic corresponding to, one or more of the at least one second user equipment.

In an embodiment, the failure indication may be indicative of a number of the at least one second user equipment with respect to which the first user equipment failed to transmit, according to the at least one configured grant resource, a protocol data unit to be transmitted to the radio network node that resulted in the protocol data unit skipping reporting criterion being satisfied.

In another example embodiment, a radio network node may comprise at least one processor configured to process executable instructions that, when executed by the at least one processor, facilitate performance of operations, comprising transmitting, to a first user equipment, a packet skipping configuration comprising a packet skipping reporting criterion to be applicable to traffic, corresponding to at least one second user equipment associated with the first user equipment, to be transmitted to the radio network node. The operations may further comprise transmitting, to the first user equipment, a configured grant pattern indication indicative of a first configured grant resource pattern usable by the first user equipment to schedule traffic to be transmitted to the radio network node. The operations may further comprise receiving, from the first user equipment, a packet skipping report message comprising a failure indication indicative of at least one of the at least one second user equipment with respect to which the first user equipment failed to transmit at least one traffic packet to be transmitted to the radio network node a number of times that satisfies the packet skipping reporting criterion. Responsive to receiving the packet skipping report message, based on the failure indication, the operations may further comprise determining a second configured grant resource pattern usable by the first user equipment to schedule traffic, corresponding to the at least one second user equipment, to be transmitted to the radio network node. The operations may further comprise transmitting, to the first user equipment, an updated configured grant pattern indication indicative of the second configured grant resource pattern.

In an embodiment, the number of times that the first user equipment failed to transmit the at least one traffic packet to be transmitted to the radio network node that satisfies the packet skipping reporting criterion may be a first actual number of times. The determining of the second configured grant resource pattern may comprise determining at least one quality-of-service parameter metric corresponding to at least one quality-of-service parameter associated with at least one traffic flow corresponding to the at least one of the at least one second user equipment indicated by the failure indication to result in at least one determined quality-of-service parameter metric and determining that the first user equipment failed to transmit the at least one traffic packet to be transmitted to the radio network node the first actual number of times based on a first time resource or a first frequency resource corresponding to the first configured grant resource pattern being unable to accommodate transmitting of the at least one traffic packet according to the at least one determined quality-of-service parameter metric. The determining of the second configured grant resource pattern may comprise estimating that the second configured grant resource pattern comprises a second time resource or a second frequency resource that corresponds to a second number of times that the first user equipment is likely to fail, according to a threshold likelihood, to transmit at least one traffic packet to be transmitted to the radio network node that is lower than the first actual number of times to result in an estimated second number of times.

The packet skipping report message may be a first packet skipping report message. The packet skipping reporting criterion may be a first packet skipping reporting criterion comprising a first value, satisfaction of which results in the first user equipment transmitting the first packet skipping report message. The operations may further comprise transmitting, to the first user equipment, a second packet skipping reporting criterion comprising a second value, to be applicable to traffic, corresponding to the at least one second user equipment, to be transmitted to the radio network node, wherein failure to transmit at least one traffic packet, corresponding to the at least one second user equipment, to be transmitted to the radio network node a second actual number of times corresponds to the second packet skipping reporting criterion being satisfied, which is to result in the first user equipment transmitting a second packet skipping report message indicative of the second packet skipping reporting criterion being satisfied.

In yet another example embodiment, a non-transitory machine-readable medium may comprise executable instructions that, when executed by at least one processor of a radio network node, facilitate performance of operations, comprising transmitting, to an extended reality processing unit, a packet skipping configuration comprising a packet skipping reporting criterion to be applicable to traffic, corresponding to at least one extended reality appliance, to be transmitted by the extended reality processing unit to the radio network node. The operations may further comprise transmitting, to the extended reality processing unit, a configured grant pattern indication indicative of a first configured grant resource pattern usable by the extended reality processing unit to schedule traffic, corresponding to the at least one extended reality appliance, to be transmitted to the radio network node. The operations may further comprise receiving, from the extended reality processing unit, a packet skipping report message comprising a failure indication indicative of at least one of the at least one extended reality appliance with respect to which the extended reality processing unit failed to transmit at least one traffic packet to be transmitted to the radio network node a first number of times that satisfies the packet skipping reporting criterion. Responsive to receiving the packet skipping report message and based on the failure indication, determining a second configured grant resource pattern usable by the extended reality processing unit to schedule traffic, corresponding to the at least one extended reality appliance, to be transmitted to the radio network node. The operations may further comprise transmitting, to the extended reality processing unit, an updated configured grant pattern indication indicative of the second configured grant resource pattern. The determining of the second configured grant resource pattern may comprise determining at least one quality-of-service parameter associated with at least one traffic flow corresponding to the at least one of the at least on extended reality appliance, indicated by the failure indication, to result in at least one determined quality-of-service parameter and determining that the extended reality processing unit failed to transmit the at least one traffic packet to be transmitted to the radio network node the first number of times based on a first time resource or a first frequency resource corresponding to the first configured grant resource pattern being unable to accommodate transmitting of the at least one traffic packet according to the at least one determined quality-of-service parameter. The determining of the second configured grant resource pattern may comprise determining that the second configured grant resource pattern comprises a second time resource or a second frequency resource that corresponds to a second number of times that the extended reality processing unit is likely to fail, or has previously failed, according to a defined failure likelihood criterion, to transmit at least one traffic packet to be transmitted to the radio network node that is lower than the first number of times.

In an embodiment, the at least one quality-of-service parameter may be a latency or a traffic volume. The second time resource or the second frequency resource may be respectively larger than the first time resource or the first frequency resource. The second time resource or the second frequency resource may be respectively smaller than the first time resource or the first frequency resource.

In an embodiment, the first frequency resource may correspond to a first frequency range. The second frequency resource may correspond to a second frequency range. The second frequency range may be different that the first frequency range.

BRIEF DESCRIPTION OF THE DRAWINGS

FIG. 4 illustrates an example protocol data unit skipping report.

FIG. 5A illustrates an example configured grant indication message indicative of at least one configured grant resource usable by a user equipment to schedule traffic to be transmitted to a radio access network node.

FIG. 5B illustrates an example updated configured grant indication message indicative of at least one configured grant resource usable by a user equipment to schedule traffic to be transmitted to a radio access network node.

FIG. 6 illustrates timing diagram of an example embodiment of a radio access network node configuring a user equipment with different uplink resource patterns based on packet skipping by a user equipment.

FIG. 7 illustrates a flow diagram of an example embodiment method of facilitating changing uplink traffic resource scheduling based on user equipment packet skipping reporting.

FIG. 8 illustrates a block diagram of an example method embodiment.

FIG. 9 illustrates a block diagram of an example radio access network node.

FIG. 10 illustrates a block diagram of an example non-transitory machine-readable medium embodiment.

DETAILED DESCRIPTION

Figure 1:
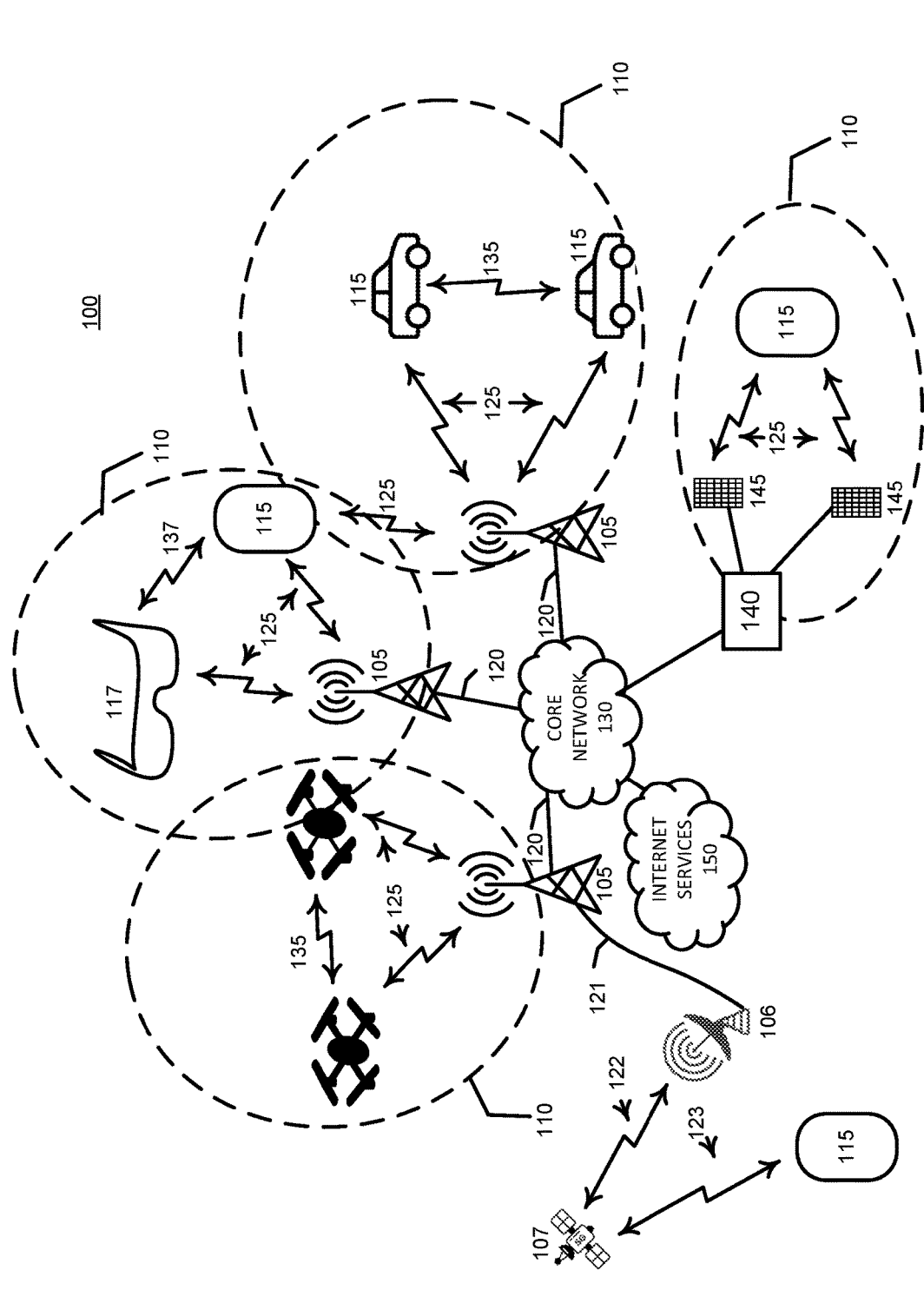
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'extended reality' ("XR") services. XR services may refer to, or may be referred to as, anything reality services. XR services may comprise VR applications, which are widely adopted XR applications that provide an immersive environment that can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed Reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at an XR capable device is desirable. Accordingly, a user equipment device accessing XR services, or traffic flows of an XR session, may be associated with certain QoS parameter criterion/criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Multi-modal XR applications may integrate different technologies to offer a versatile and comprehensive user experience. For example, a multi-modal XR application might use VR to immerse users in a virtual training environment and then seamlessly switch to AR or MR to provide real-time feedback or overlay instructional information corresponding to physical objects that may appear in an environment viewed by an XR user. Such feedback or instructional information may relate to stationary objects or may be information that does not change frequently and may be referred to as stable information.

An advantage of multi-modal XR applications is the adaptability to facilitate different contexts and different user preferences. An XR application can provide varying levels of immersion and interaction, allowing users to choose the most suitable mode of engagement based on the user's needs or the specific task at hand. Additionally, multi-modal XR can enable collaborative experiences, allowing users in different physical locations to interact within the same virtual space.

Uses of multi-modal XR applications extend beyond entertainment and gaming, with widespread adoption in fields such as healthcare, education, engineering, and marketing. Medical practitioners can use multi-modal XR applications to simulate complex surgeries, educators can create interactive and immersive learning experiences, and architects can visualize and modify building designs in real-time.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a RAN base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 11. An XR processing unit may also comprise components described in reference to FIG. 12

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors.

The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming opera-tions for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets asso-ciated with different directions of transmission. Transmis-sions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with trans-missions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combi-nation of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feed-back (e.g., a multi-panel type codebook, a linear combina-tion type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide estab-lishment, configuration, and maintenance of an RRC con-nection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the like-lihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
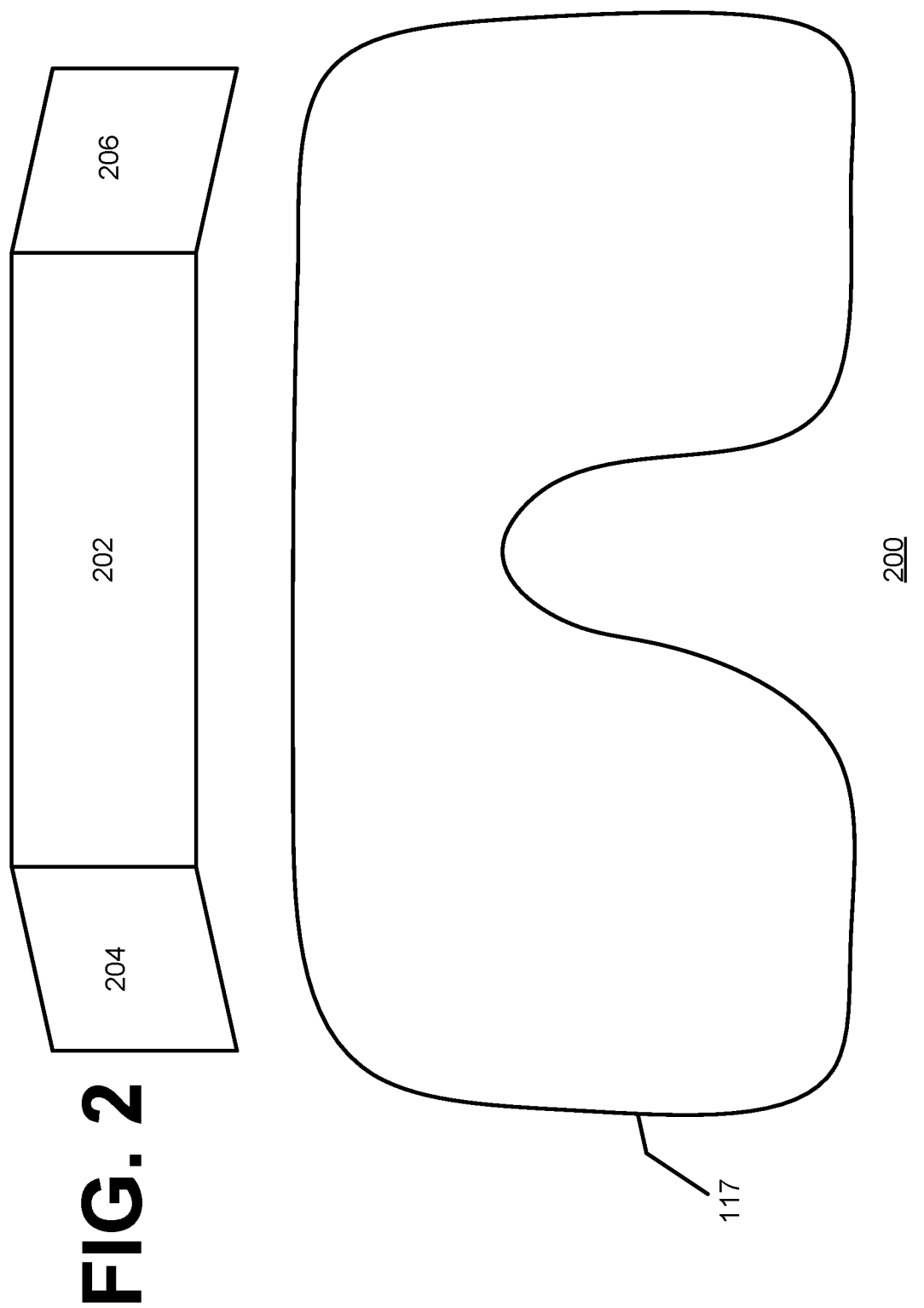
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user equipment device may be associated with certain QoS parameter criterion/criteria with respect to which measured values, or metrics, corresponding to traffic flows that facilitate XR service may be analyzed. Adjusting scheduling of traffic such that a measured traffic flow metric satisfies a QoS parameter, such as, for example, a data rate, an end-to-end latency, or a reliability may be beneficial to a user's XR experience.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

In an embodiment, a user equipment may be deployed as an extended reality processing unit and may facilitate communication with a RAN node on behalf of a less capable end XR appliance (e.g., less capable in terms of processing power, battery capacity, transmitter power, or the like). An extended reality processing unit may comprise an 'in-box' processing unit/device that facilitates signaling, traffic handling, and overall radio assistance to an end XR appliance (e.g., helmets, or glasses), which may be capable of communicating directly with a RAN node but with reduced capability. Accordingly, an intermediate XR processing unit (e.g., a laptop or smartphone that is intermediate with respect to communication links between a RAN node and an end XR appliance) may facilitate relaxing a large subset of radio function and operations, traffic processing, and battery consumption load with respect to an end XR appliance thus leading to a more efficient end XR device design (e.g., requiring less battery size, dissipating less heat, etc.).

Figure 3:
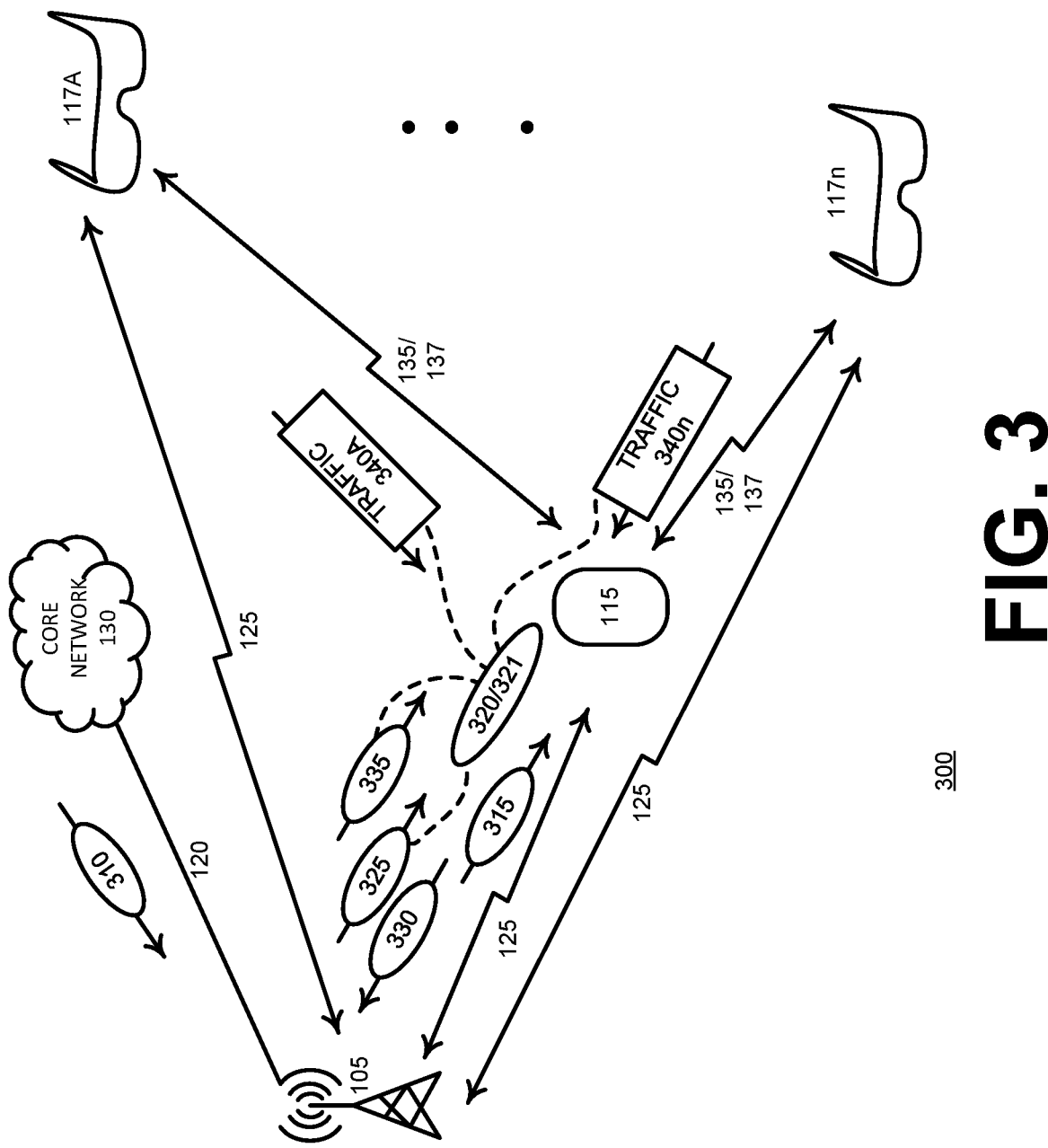
FIG. 3 illustrates an example environment with an anything reality appliance tethered to a user equipment that reports skipping of packet transmission.

Turning now to FIG. 3, the figure illustrates an example environment 300 with an extended reality appliance 117 tethered to an extended reality processing unit user equipment 115. Appliance 117 may be referred to as an end XR appliance in reference to the relationship of being at an end of a communication session, with respect to RAN node 105, with extended reality processing unit 115 being located intermediate to the RAN node and the appliance. XR processing unit 115 may be more capable with respect to battery capacity (or may be supplied power via a wired power supply receiving power from an electrical wall outlet), or with respect to processing capability, than XR appliance 117. In an embodiment, a downlink traffic flow providing traffic to a peripheral portion 204/206 (shown in FIG. 2) of VR/XR appliance 117 may be related to a downlink traffic flow carrying traffic to be displayed by a pose portion 202 of the appliance. In another example, two different traffic flows may respectively carry traffic directed to right side 202R and left side 202L of pose portion 202 and thus may be related. In another example, an uplink traffic flow may carry traffic related to a downlink traffic flow.

Facilitating extended reality services via cellular wireless communications may negatively impact spectral efficiency or energy consumption at RAN nodes or user equipment due to stringent combined requirements regarding capacity, latency, and reliability, one or more of which may tend to impose contradictory requirements with respect to one or more of the other requirements. For example, to facilitate capacity and video rendering requirements corresponding to many XR applications, advanced multi-antenna system, sophisticated processing, and larger battery capacities may be at end XR devices/appliance, which may cause an increase in weight and heat generated and may detract from appearance of an end XR device/appliance (e.g., XR glass, helmet, or bracelet, etc.).

Deployment of a high-capability (with respect to an XR appliance 117) intermediate XR processing unit 115 between RAN 105 and a XR appliance processing unit may facilitate relaying part of, or all of, XR radio traffic to or from the end XR device/appliance, thus reducing radio burden from the lower capability and lower weight end XR device/appliance. Burdens that may be offloaded from an end XR appliance 117 to intermediate XR processing unit 115 may comprise, for example, local traffic storage, processing of heavy control channel decoding, XR local video rendering, or advanced radio antenna manipulation. Thus, advanced receiver and processing capability may be facilitated for critical XR services with respect to an XR appliance 117, which may be lighter, more aesthetically pleasant, and more efficient than if the end XR appliance is not designed with capability to offload the burdens to intermediate XR processing unit 115.

Conventional techniques may implement capacity-beneficial packet skipping procedures that facilitate user equipment skipping transmission of non-useful packets. According to conventional techniques, when an XR protocol data unit, for example a packet, associated with a traffic flow, buffered in a buffer corresponding to a device for a period such that the device determines that the packet will likely not be delivered (e.g., delivered to a RAN node) according to a latency budget corresponding to the traffic flow, the packet may be deemed non-useful and transmission of the packet may be 'skipped' or the packet may be dropped from the buffer to avoid use of radio interface to transmit a non-useful packet, thus minimizing waste of scheduled radio resources.

While using an intermediate XR processing unit, packets associated with extended reality services may be generated at an end XR device/appliance 117 but relayed, buffered, and actually transmitted by intermediate processing unit 115, which may disrupt tracking and reporting of packets to be skipped, which may result in invalidating, disrupting, or reducing efficiency of conventional packet skipping behaviour at a user equipment and may also result in invalidating, disrupting, or reducing efficiency of uplink resource scheduling behaviour at a RAN node serving the XR processing unit and the end XR appliances.

When packet transmission is disrupted/skipped due to use of an intermediate XR processing unit 115 that may relay traffic on behalf of an end XR appliance 117, which disruption may result from inter-device delay caused by relaying of traffic from an appliance 117 to XR processing unit 115, uplink configured grant ("CG") scheduling operations performed by RAN node 105 may be degraded. For example, RAN node 105 may be misled by packet skipping by one or more appliances 117, and may, according to conventional techniques, pre-allocate uplink periodic resource occasions for carrying uplink traffic associated with the appliances. Resource occasions pre-allocated according to conventional techniques may be suboptimal insofar as packet skipping may increase due to the pre-allocated CG resource occasions not being time-aligned with packets generated by a user equipment and thus packets may be buffered longer than a configured period such that the buffered packet(s) may be deemed not useful and transmission thereof may therefore be skipped. Accordingly, embodiments disclosed herein may facilitate packet-discarding-aware CG scheduling wherein uplink resource scheduling by a RAN node 105 may be adaptively fine-tuned, based on feedback, indicative of real-time packet discarding, received from an intermediate XR processing unit 115 to minimize packet skipping at one or more XR appliances 117.

Packet-Discarding-Aware Configured Grant Pattern Adaptation.

Continuing description of FIG. 3, RAN node 105 may receive packet discarding configurations 310 from equipment of core network 130 via backhaul interface(s) 120, including a maximum number of skipped packet transmission per device before reporting of a packet skipping report 330 is triggered. RAN 105 node may transmit protocol data unit skipping configuration 315 towards intermediate XR WTRU 115, via radio interface link(s) 125, for example, as a downlink control information ("DCI") message. Configuration 315 may comprise a configured maximum number of allowable packet skips per appliance 117 before reporting packet skipping to RAN 105 is triggered.

RAN node 105 may transmit toward intermediate XR processing unit 115 active configured grant (CG) pattern indication 325 indicating sharable CG resource set(s) 320 to be usable by end XR appliance(s) 117. RAN node 105 may receive packet skipping report 330 in a message 400 (shown in FIG. 4), from intermediate XR processing unit 115. Packet skipping report 330 may comprise one or more end XR device identifiers 410A-410$n$, corresponding, respectively, to one or more appliances 117A-117$n$ shown in FIG. 3. Identifiers 410 may be indicative of one or more appliances 117 that have implemented a number of packet skips/discards that is larger than the configured maximum allowable number of packet skips configured via configuration 315. An identifier 410 may be referred to as a failure indication insofar as an identifier corresponding to an XR appliance 117 may be indicative that a packet associated with the XR appliance may not have been transmitted (e.g., a transmission failure) and that the transmission failure may have resulted in triggering transmitting of a packet skipping report 330 that comprises the identifier in field 410. RAN node 105 may update (e.g., the RAN node may increment or increase) a counter corresponding to a current number of appliances 117 that have skipped transmission of non-usable packets in excess of the configured maximum allowable values configured via configuration 315 with respect to resources associated with a currently active CG scheduling pattern.

As shown in FIG. 5A, in information 500 a counter associated with pattern $y_1$ corresponds to ten appliances 117 that have skipped transmission of non-usable packets in excess of the maximum allowable values configured via configuration 315. As an example, if two appliances 117 (e.g., failure indications indicated by two appliance identifiers in fields 410A and 410$n$ shown in FIG. 4) have skipped transmission of non-usable packets in excess of the configured maximum allowable values configured via configuration 315, RAN node 105 may update a counter/value from '10' as shown in field 510A in FIG. 5A associated with pattern $y_1$, to '12' shown in field 520A of information 501 corresponding to pattern $y_1$ as shown in FIG. 5B. RAN node 105 may transmit an updated configured grant indication 335, comprising an indication of pattern $y_z$, shown in field 515$n$, to configure XR processing unit 115 to use sharable resources corresponding to pattern $y_z$ instead of resources corresponding to pattern $y_1$ because pattern $y_z$ now corresponds to '11' appliances that previously skipped transmission of non-usable packets in excess of the configured maximum allowable values configured via configuration 315 and pattern $y_1$ now corresponds to '12' appliances that have skipped transmission of non-usable packets in excess of the configured maximum allowable values configured via configuration 315. Because pattern $y_z$ corresponds to fewer appliances 117 that previously skipped packet transmissions that triggered transmission of a report 330 than pattern $y_1$, RAN node 105 may configures XR processing unit 115, via indication 335, to use/share CG resource pattern $y_z$ to facilitate delivery of traffic 340 corresponding to one or more appliances 117.

Accordingly, updated configured grant indication 335 may facilitate RAN node 105 dynamically, in a best effort manner, determining updated resources 321 corresponding to one of multiple CG grant resource patterns that is likely to minimize packet skipping/discarding of packets that are buffered and that are to be transmitted to RAN node 105. Packet skipping for one or more appliances 117 may not be based only on packet generation rate of each appliance 117 but packet skipping may also be based on: packet generation volume among all appliances 117A-117n, inter-device link delays (e.g., delay corresponding to transmitting packets from an appliance 117 to XR processing unit 115 via links 135/137), and CG resources available for sharing to appliances 117 by XR processing unit. In an embodiment, counters corresponding to number of appliances 117 that have skipped transmission of non-useful packets in excess of a configured criterion may be reset, or may be different, for traffic flows or traffic sessions that is/are different from traffic 340 or a session corresponding thereto.

On condition of XR processing unit 115 determining a second CG resources pattern that is likely to result in transmission of fewer packets to be transmitted by an appliance 117 being skipped than a previously scheduled/first active CG pattern (e.g., a pattern indicated as current by indication 325), RAN node 105 may transmit towards XR processing 115 updated CG scheduling pattern information indication 335 to activate the second, or updated, CG scheduling pattern. Accordingly, RAN node 105 can schedule CG uplink resources according to a pattern that are likely to minimize a number packet skips/transmission failures with respect to appliances 117A-117n by dynamically adapting a configured CG resource pattern based on reporting of packet skipping corresponding to traffic flows 340A-340n.

Figure 13:
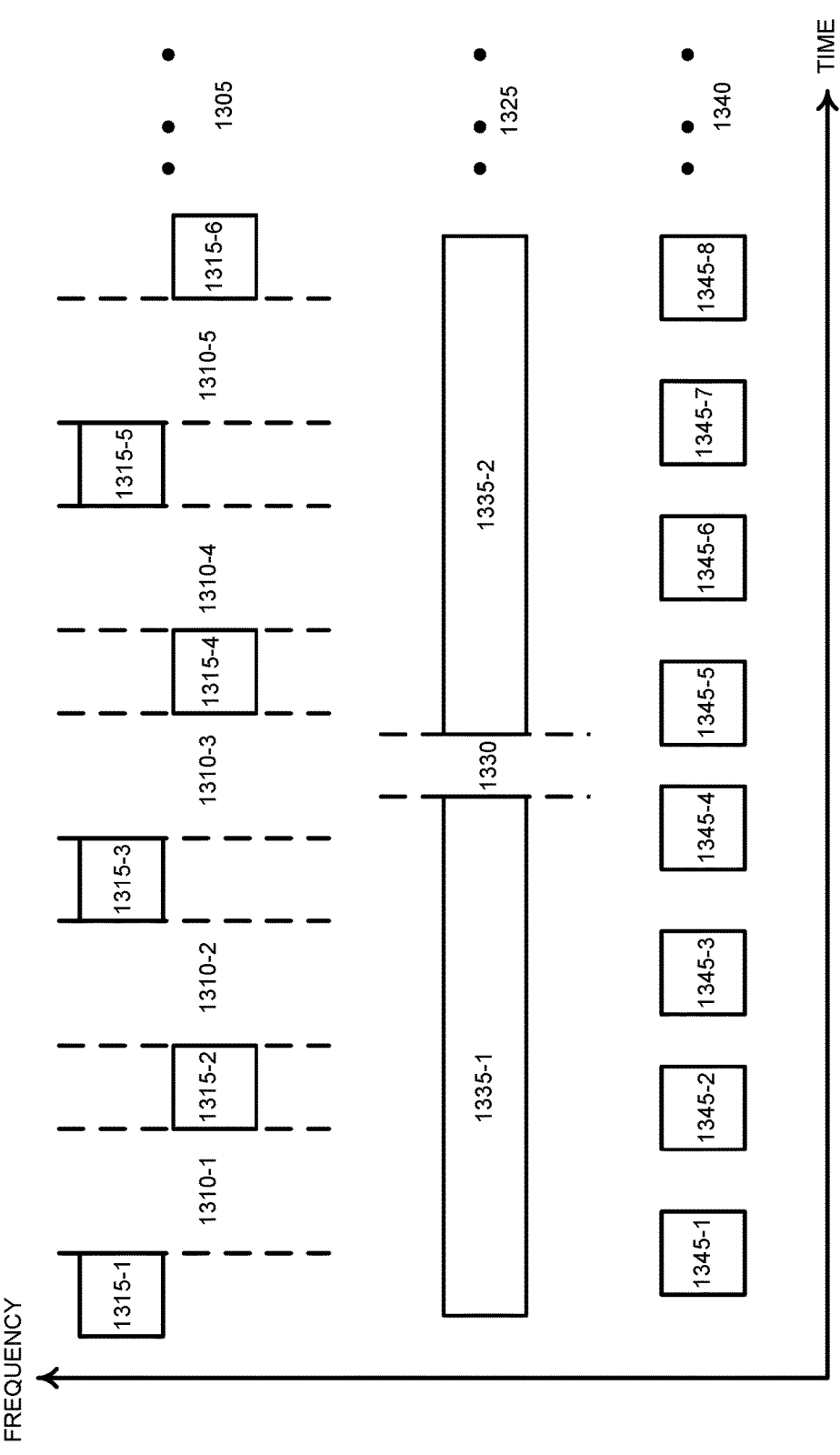
FIG. 13 illustrates multiple sharable resource patterns.

As an example, as shown in FIG. 13, if an appliance 117 skips transmission of packets because the packets are deemed non-useful due to being generated, or scheduled for transmission, during gaps 1310 between resource blocks 1315 of resources pattern 1305, RAN node 105 may schedule a different pattern 1325 comprising longer-in-duration frequency resources 1335 that have fewer gaps 1330 with respect to the number of gaps 1310 corresponding to resource pattern 1305. Thus, RAN node 105 may determine that pattern 1325 may likely correspond to fewer packets being deemed non-useful, and thus being skipped, with respect to a traffic flow 340 than use of pattern 1305. RAN node 105 may determine a number of appliances 117 that have skipped transmission of non-useful packets in excess of a configured criterion based on receiving a packet skipping report 330 comprising one or more failure indications (e.g., one or more appliance identifiers 410 shown in FIG. 4) that may correspond to the appliance(s). The transmitting/reporting of a packet skipping report may have been triggered by a number of non-useful packet transmissions being skipped by an identified appliance 117 equaling or exceeding a configured criterion value. If traffic flow 340, shown in FIG. 3, tends to comprise frequently generated packets having a stringent latency requirement wherein some of the packets may have been deemed non-useful due to being scheduled for transmission, according to pattern 1305, during one or more gaps 1310, RAN node 105 may determine to indicate to extended reality processing unit 115 that sharable resources corresponding to pattern 1340 have been granted for use in facilitating delivery of traffic flow 340 because the shorter gaps between resource blocks 1345 may reduce a number of packets to be transmitted being discarded or skipped. RAN node 105 may determine that pattern 1325 may result in a reduced number of packets to be transmitted being skipped based on a previously determined number of indications of appliances in one or more packet skipping reports 330.

Turning now to FIG. 6, the figure illustrates a timing diagram of an example embodiment method 600 to facilitate radio access network node 105 updating an uplink resource configured grant pattern, sharable by intermediate XR processing unit 115 to user equipment/XR appliance 117, to facilitate delivery of traffic packets corresponding to the appliance to the radio access network node. At act 605, RAN node 105 may receive a packet discarding configuration, for example configuration 310 described in reference to FIG. 3, from core network 130 via backhaul interface links 120. The configuration received at act 605 may comprise a maximum number of missed protocol data unit skips per device (e.g., per an appliance 117) before transmission by XR processing unit 115 to RAN node 105 of a packet skipping report is triggered. At act 610, RAN node 105 may transmit a packet skipping configuration, for example configuration 315 described in reference to FIG. 3, towards intermediate XR processing unit 115 via a wireless radio link 125. Configuration information 315 may be transmitted to XR processing unit 115 as a downlink control information message and may comprise the maximum number of missed packet transmissions indicated to RAN node 105 in configuration information 310. At act 615, RAN node 105 may configure/transmit toward intermediate XR processing unit 115 an active configured grant pattern indication indicating sharable CG uplink resources that may be shared by end XR appliances (s) 117.

Figure 4:
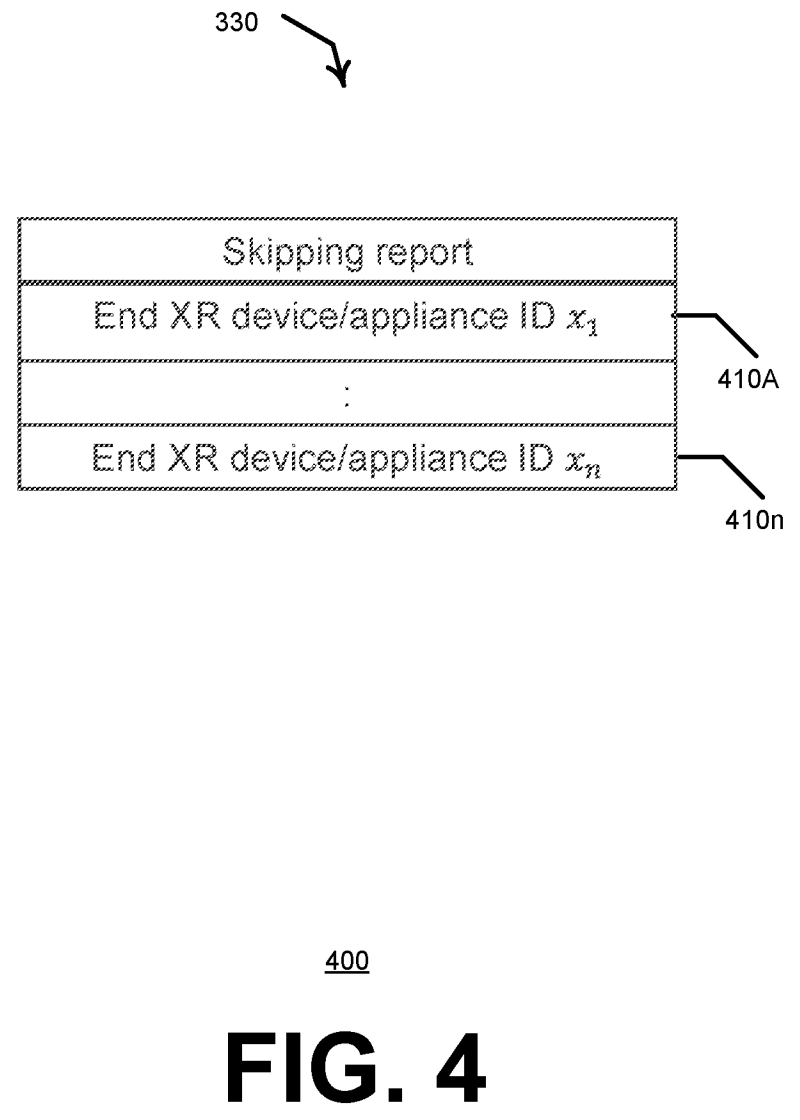

At act 620, RAN node 105 may receive from XR processing unit 115 a PDU/packet skipping report, for example a report 330 described in reference to FIG. 3 and shown in FIG. 4. Transmission of the packet skipping report may be triggered by a number of packets being skipped by an appliance 117 equaling or exceeding a number configured via configuration 315 transmitted at act 610. Packet skipping report 330 may indicate one or more end XR appliance/device identifiers corresponding to one or more appliances 117 that may be using resources corresponding to the configured grant pattern configured at act 615 and that may have experienced, or inflicted, a number of PDU/packet skipping instants that is larger than the configured threshold number of allowable PDU skipping instances before generation of transmission of a packet skipping report to RAN node 105 is triggered.

At act 625, RAN node 105, based on receiving a packet skipping report indicative of a number of appliances 117 indicated in the packet skipping report as having skipped transmission of more packets than a configured criterion, may update (e.g., increment or increase) a packet skipping counter corresponding to the currently active CG grant pattern configured at act 615. At act 630, RAN node 105 may determine a different CG pattern than the pattern configured at act 615 that may result in fewer packets being deemed non-useful and thus fewer packets being skipped by an appliance 117. The determination made at act 630 may be based on a number of appliances 117 that may have inflicted skipping of packets in excess of the threshold/criterion configured at act 610. For example, if a previously config-ured CG pattern resulted in three appliances 117 skipping transmission of packets in excess of a number configured at act 610, and use of a currently configured CG pattern results in four appliances 117 skipping transmission of packets in excess of the number configured at act 610, RAN node 105 may determine that the previously used CG pattern that resulted in three appliances skipping transmission of packets is to be an updated CG pattern. RAN node 105 may transmit toward XR processing 115 an updated CG scheduling pat-tern information indication (e.g., indication 335 described in reference to FIG. 3) indicative of a CG pattern to use as a updated, or now-current, CG pattern to be usable by, or sharable by, the XR processing unit to one or more end appliance(s) 117, to facilitate delivery of uplink traffic generated by one or more end XR appliance(s) (e.g., the RAN node may determine to make current the pattern that resulted in three appliances 117 exceeding a skipped packet criterion instead of the pattern that resulted in four appli-ances exceeding the skipped packet criterion).

Turning now to FIG. 7, the figure illustrates a flow diagram of an example embodiment 700. Method 700 begins at act 705. At act 710, a radio access network node may receive from equipment of a core network packet discarding configuration information, for example, informa-tion contained in a configuration 310 described in reference to FIG. 3. The discarding configuration information may comprise a protocol data unit skipping reporting criterion. At act 715, the radio access network node may transmit, to an XR processing unit, protocol data unit skipping configura-tion information, which may be referred to as packet skip-ping configuration information, for example information contained in a configuration 315 described in reference to FIG. 3. At act 720, the radio access network node may transmit to the XR processing unit a configured grant resource pattern indication, such as, for example, indication 325 described in reference to FIG. 3. Indication 325 may be indicative of a resource pattern comprising the set of resources 320 that may be applicable to traffic packets associated with traffic flow 340 corresponding to traffic packets to be transmitted by one or more appliances 117 to the radio access network node as shown in reference to FIG. 3. At act 725, the XR processing unit may, according to uplink resources indicated by indication 325, facilitate deliv-ery of traffic packets corresponding to a traffic flow, for example traffic flow 340, corresponding to one or more end XR appliances 117.

At act 730, the XR processing unit may determine whether a packet skipping reporting criterion, for example a criterion received in the configuration transmitted at act 715, has been satisfied. For example, if a packet skipping report-ing criterion comprises twenty traffic packets associated with a particular appliance 117 being buffered a length of time that causes the packets to be deemed non-useful during a configured sample period, the XR processing unit may trigger transmitting of a packet skipping report 330 to the radio access network node indicative of the particular appli-ance 117 with respect to which more than twenty traffic packets were deemed non-useful during the sample period. If a determination is made at act 730 that a packet skipping reporting criterion has not been satisfied, method 700 may return to act 725 and the XR processing unit may continue to facilitate delivery of traffic packets corresponding to one or more appliances 117, which may include the particular appliance 117 with respect to which packets are analyzed at act 730.

However, if a determination is made at act 730 that a packet skipping reporting criterion has been satisfied with respect to one or more particular end XR appliances 117, the XR processing unit may generate a packet skipping report and transmit the packet skipping report to the radio access network node at act 735. After receiving a packet skipping report transmitted at act 735, the radio access network node may at act 740 increment, or increase, a counter correspond-ing to the configured grant resource pattern indicated by the resource pattern indication transmitted at act 720. For example, if a number of packets corresponding to one particular end XR appliance are deemed to be non-useful, are discarded, and result in a satisfaction of the packet skipping reporting criterion at act 730, the radio access network node may increment by one a count corresponding to the resource pattern indicated at act 720. If a number of packets corresponding to two particular end XR appliances are deemed to be non-useful, are discarded, and result in a satisfaction of the packet skipping reporting criterion with respect to each of the two appliances at act 730, the radio access network node may increase, by two, a counter corresponding to the resource pattern indicated at act 720. If three end XR appliances 117 correspond to satisfaction of the packet skipping reporting criterion the radio access network node may increase, by three, the counter corre-sponding to the resource pattern, and so on.

At act 745, the radio access network node may determine whether use of a different configured grant resource pattern than the pattern indicated by the indication transmitted at act 720, use of which may have resulted in the incrementing or increasing of the count corresponding to the resource pattern at act 740, would likely result in transmission of fewer packets corresponding to traffic associated with one or more appliances 117 being skipped. If the radio access network node determines that use of another configured grant resource pattern than the pattern indicated at act 720 would not likely result in a reduction in skipping of packet trans-missions, method 700 may return to act 725 and the XR processing unit may continue to facilitate delivery of traffic corresponding to one or more end XR appliances 117.

If, however, the radio access network node determines at act 745 that a different configured grant resource pattern than the pattern indicated act 720 would likely result in a reduc-tion in skipping of packet transmissions, at act 750 the radio access network node may transmit to the XR processing unit an indication message indicative of an updated configured grant resource pattern, which indication message may be referred to as an updated configured grant indication mes-sage, for example indication 335 described in reference to FIG. 3. Accordingly, the radio access network node may determine an updated set of configured grant resources that may be shareable among more than one end XR appliance by an XR processing unit based on a number of end XR appliances that have skipped transmission of a number of non-useful traffic packets equal to, or in excess of, a packet skipping reporting criterion (e.g., based on the updated resources corresponding to a pattern that is associated with fewer appliances 117 being indicated in one or more packet skipping reports 330). The higher the number of appliances, indicated by the increased/incremented counter, that corre-spond to occurrences of packet skipping that exceeds the packet skipping reporting criterion when using a particular configured grant resource pattern, the less likely the radio access network node will be to schedule the particular configured grant resource pattern for use by the one or more end XR appliances.

Turning now to FIG. 8, the figure illustrates an example embodiment method 800 comprising at block 805 facilitating, by a radio network node comprising at least one processor, transmitting, to a first user equipment, a protocol data unit skipping configuration comprising a protocol data unit skipping reporting criterion to be applicable to traffic, corresponding to at least one second user equipment associated with the first user equipment, to be transmitted to the radio network node; at block 810 facilitating, by the radio network node, transmitting, to the first user equipment, a configured grant indication indicative of at least one configured grant resource usable by the first user equipment to schedule traffic to be transmitted to the radio network node; at block 815 facilitating, by the radio network node, receiving, from the first user equipment, a protocol data unit skipping report message comprising a failure indication indicative of at least one of the at least one second user equipment corresponding to which the first user equipment failed to transmit, according to the at least one configured grant resource, at least one protocol data unit to be transmitted to the radio network node a number of times that satisfies the protocol data unit skipping reporting criterion; at block 820 responsive to receiving the protocol data unit skipping report message, based on the failure indication, determining, by the radio network node, at least one updated configured grant resource usable by the first user equipment to schedule traffic, corresponding to the at least one second user equipment, to be transmitted to the radio network node; and at block 825 facilitating, by the radio network node, transmitting, to the first user equipment, an updated configured grant indication message indicative of the at least one updated configured grant resource.

Turning now to FIG. 9, the figure illustrates an example radio network node, comprising at block 905 at least one processor configured to process executable instructions that, when executed by the at least one processor, facilitate performance of operations, comprising transmitting, to a first user equipment, a packet skipping configuration comprising a packet skipping reporting criterion to be applicable to traffic, corresponding to at least one second user equipment associated with the first user equipment, to be transmitted to the radio network node; at block 910 transmitting, to the first user equipment, a configured grant pattern indication indicative of a first configured grant resource pattern usable by the first user equipment to schedule traffic to be transmitted to the radio network node; at block 915 receiving, from the first user equipment, a packet skipping report message comprising a failure indication indicative of at least one of the at least one second user equipment with respect to which the first user equipment failed to transmit at least one traffic packet to be transmitted to the radio network node a number of times that satisfies the packet skipping reporting criterion; at block 920 responsive to receiving the packet skipping report message, based on the failure indication, determining a second configured grant resource pattern usable by the first user equipment to schedule traffic, corresponding to the at least one second user equipment, to be transmitted to the radio network node; and at block 925 transmitting, to the first user equipment, an updated configured grant pattern indication indicative of the second configured grant resource pattern.

Turning now to FIG. 10, the figure illustrates a non-transitory machine-readable medium 1000 comprising at block 1005 executable instructions that, when executed by at least one processor of a radio network node, facilitate performance of operations, comprising, transmitting, to an extended reality processing unit, a packet skipping configuration comprising a packet skipping reporting criterion to be applicable to traffic, corresponding to at least one extended reality appliance, to be transmitted by the extended reality processing unit to the radio network node; at block 1010 transmitting, to the extended reality processing unit, a configured grant pattern indication indicative of a first configured grant resource pattern usable by the extended reality processing unit to schedule traffic, corresponding to the at least one extended reality appliance, to be transmitted to the radio network node; at block 1015 receiving, from the extended reality processing unit, a packet skipping report message comprising a failure indication indicative of at least one of the at least one extended reality appliance with respect to which the extended reality processing unit failed to transmit at least one traffic packet to be transmitted to the radio network node a first number of times that satisfies the packet skipping reporting criterion; at block 1020 responsive to receiving the packet skipping report message and based on the failure indication, determining a second configured grant resource pattern usable by the extended reality processing unit to schedule traffic, corresponding to the at least one extended reality appliance, to be transmitted to the radio network node; at block 1025 transmitting, to the extended reality processing unit, an updated configured grant pattern indication indicative of the second configured grant resource pattern; at block 1030 wherein the determining of the second configured grant resource pattern comprises determining at least one quality-of-service parameter associated with at least one traffic flow corresponding to the at least one of the at least on extended reality appliance, indicated by the failure indication, to result in at least one determined quality-of-service parameter, at block 1035 determining that the extended reality processing unit failed to transmit the at least one traffic packet to be transmitted to the radio network node the first number of times based on a first time resource or a first frequency resource corresponding to the first configured grant resource pattern being unable to accommodate transmitting of the at least one traffic packet according to the at least one determined quality-of-service parameter; and at block 1040 determining that the second configured grant resource pattern comprises a second time resource or a second frequency resource that corresponds to a second number of times that the extended reality processing unit is likely to fail, according to a defined failure likelihood criterion, to transmit at least one traffic packet to be transmitted to the radio network node that is lower than the first number of times.

Figure 11:
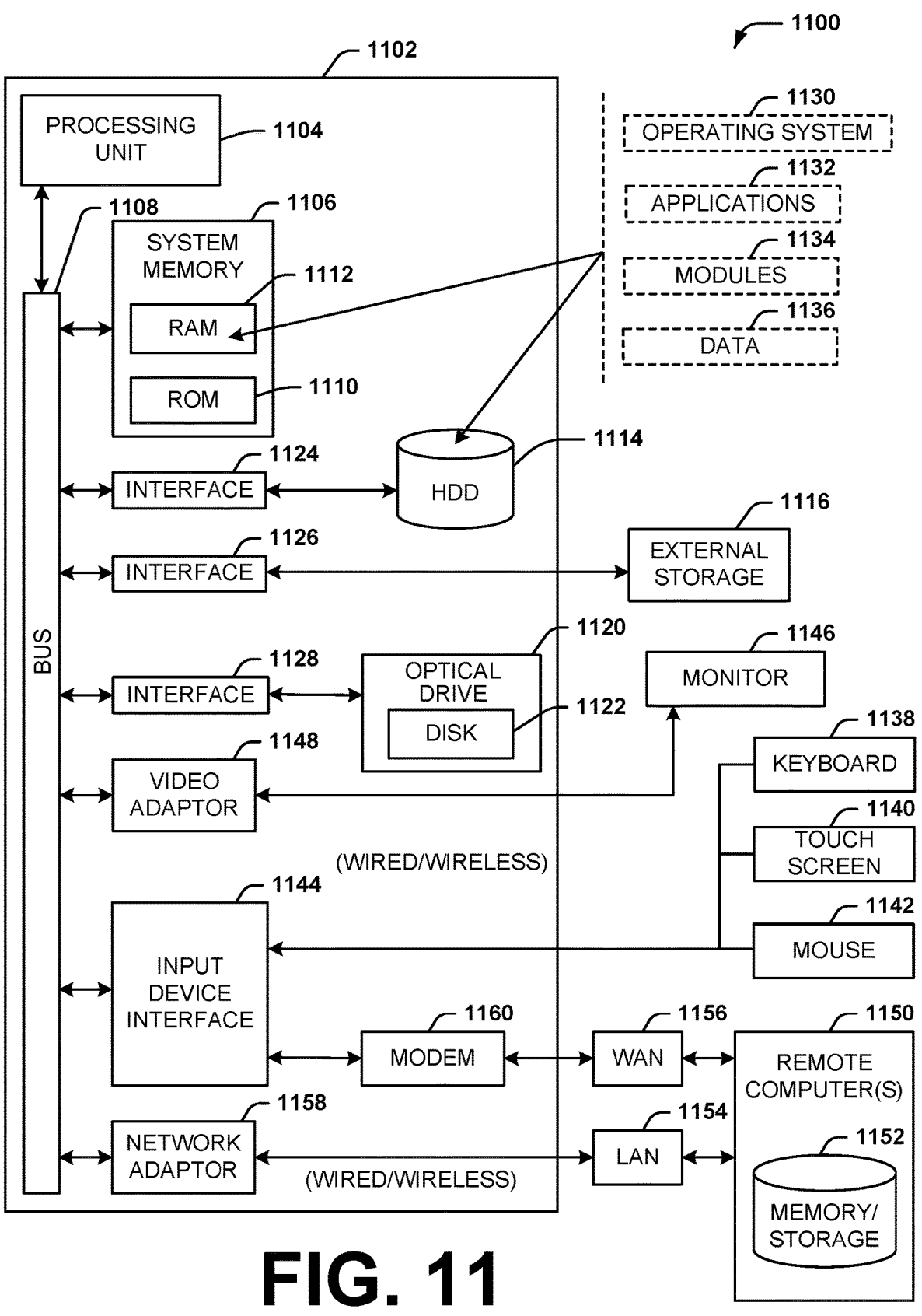
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
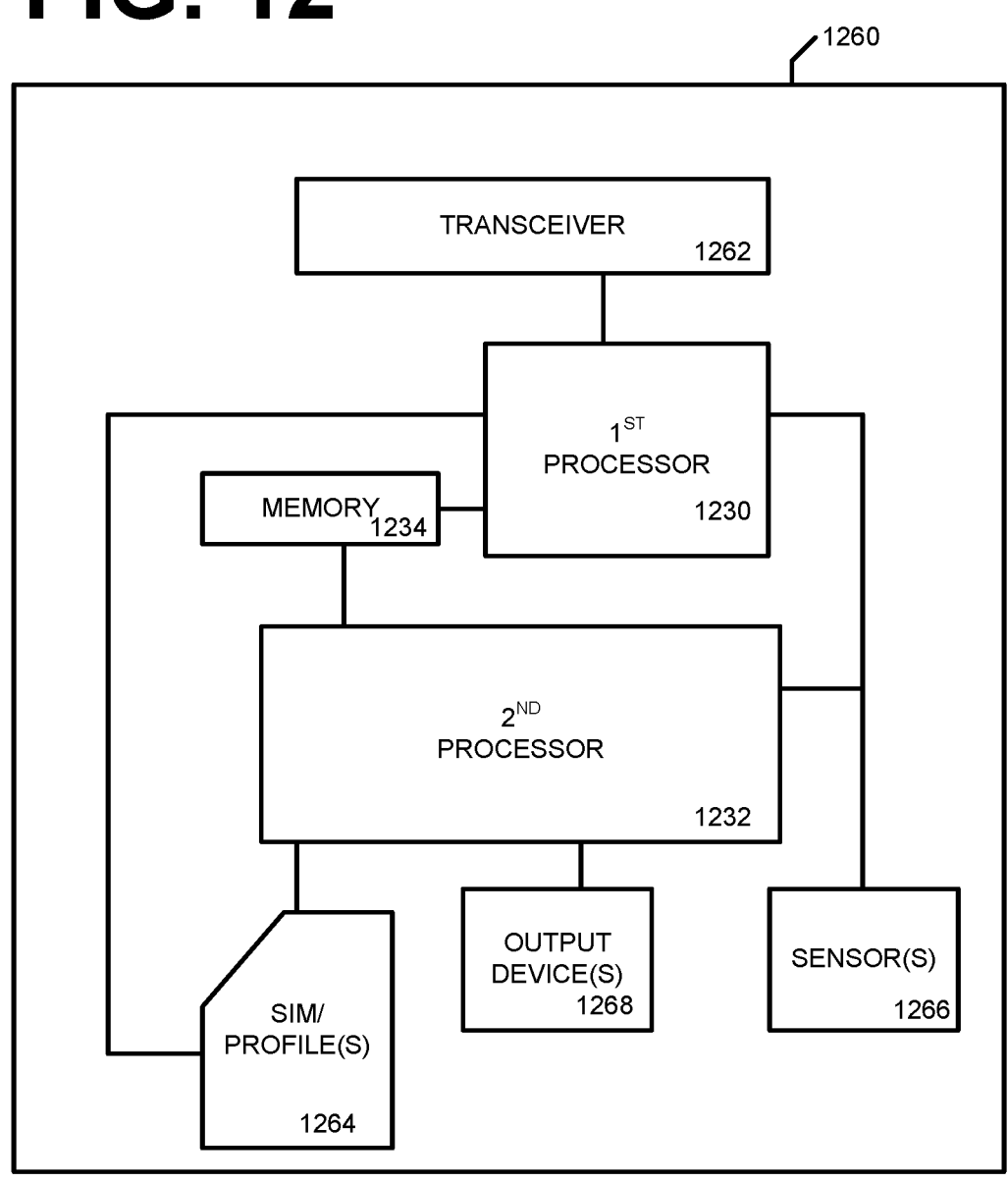
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |

34

TABLE 1-continued

| Term | Definition |
| --- | --- |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio network node comprising at least one processor, transmitting, to a first user equipment, a protocol data unit skipping configuration comprising a protocol data unit skipping reporting criterion to be applicable to traffic, corresponding to at least one second user equipment associated with the first user equipment, to be transmitted to the radio network node;

facilitating, by the radio network node, transmitting, to the first user equipment, a configured grant indication indicative of at least one configured grant resource usable by the first user equipment to schedule traffic to be transmitted to the radio network node;

facilitating, by the radio network node, receiving, from the first user equipment, a protocol data unit skipping report message comprising a failure indication indicative of at least one of the at least one second user equipment corresponding to which the first user equipment failed to transmit, according to the at least one configured grant resource, at least one protocol data unit to be transmitted to the radio network node a number of times that satisfies the protocol data unit skipping reporting criterion;

responsive to receiving the protocol data unit skipping report message, based on the failure indication, determining, by the radio network node, at least one updated configured grant resource usable by the first user equipment to schedule traffic, corresponding to the at least one second user equipment, to be transmitted to the radio network node; and facilitating, by the radio network node, transmitting, to the first user equipment, an updated configured grant indication message indicative of the at least one updated configured grant resource.

2. The method of claim 1, wherein the at least one configured grant resource is at least one first configured grant resource and comprises a first configured grant resource pattern and wherein the at least one updated configured grant resource is at least one second configured grant resource and comprises a second configured grant resource pattern.

3. The method of claim 2, wherein the at least one configured grant resource and the at least one second configured grant resource are sharable by the first user equipment with respect to the at least one second user equipment.

4. The method of claim 1, wherein the protocol data unit skipping reporting criterion is a protocol data unit skipping reporting criterion value, and wherein the updated configured grant indication message comprises an updated protocol data unit skipping reporting criterion that is to be applicable to traffic, corresponding to the at least one second user equipment, to be transmitted to the radio network node.

5. The method of claim 4, wherein the protocol data unit skipping reporting criterion is a current protocol data unit skipping reporting criterion and comprises a current protocol data unit skipping threshold value, wherein the updated protocol data unit skipping reporting criterion comprises an updated protocol data unit skipping threshold value, and wherein the updated protocol data unit skipping threshold value is higher than the current protocol data unit skipping threshold value.

6. The method of claim 4, wherein the protocol data unit skipping reporting criterion is a first protocol data unit skipping reporting criterion, wherein the at least one configured grant resource is at least one first configured grant resource, wherein the protocol data unit skipping report message is a first protocol data unit skipping report message, wherein the failure indication is a first failure indication, wherein the updated configured grant indication message is a first updated configured grant indication message, wherein the at least one updated configured grant resource is at least one first updated configured grant resource, and wherein the at least one first updated configured grant resource is at least one second configured grant resource, the method further comprising:

facilitating, by the radio network node, receiving, from the first user equipment, a second protocol data unit skipping report message comprising a second failure indication indicative of at least one of the at least one second user equipment corresponding to which the first user equipment failed to transmit, according to the at least one first updated configured grant resource, at least one protocol data unit to be transmitted to the radio network node a number of times that satisfies the updated protocol data unit skipping reporting criterion;

responsive to receiving the protocol data unit skipping report message, based on the second failure indication, determining, by the radio network node, at least one third configured grant resource usable by the first user equipment to schedule traffic, corresponding to the at least one second user equipment, to be transmitted to the radio network node; and facilitating, by the radio network node, transmitting, to the first user equipment, a second updated configured grant indication message indicative of the at least one third configured grant resource.

7. The method of claim 6, wherein the updated protocol data unit skipping reporting criterion is a second protocol data unit skipping reporting criterion, wherein the at least one third configured grant resource is the same as the at least one first configured grant resource or the at least one second configured grant resource, and wherein the at least one third configured grant resource is associated in the second updated configured grant indication message with a third protocol data unit skipping reporting criterion that is different than the first protocol data unit skipping reporting criterion or the second protocol data unit skipping reporting criterion.

8. The method of claim 1, wherein the first user equipment is configured to facilitate extended reality processing unit functionality with respect to the at least one second user equipment.

9. The method of claim 8, wherein the at least one second user equipment comprises an extended reality appliance.

10. The method of claim 1, wherein the at least one second user equipment comprises more than one second user equipment.

11. The method of claim 10, wherein the traffic to be transmitted is able to comprise traffic from one or more of the at least one second user equipment.

12. The method of claim 11, wherein the failure indication is indicative of a number of the at least one second user equipment with respect to which the first user equipment failed to transmit, according to the at least one configured grant resource, a protocol data unit to be transmitted to the radio network node that resulted in the protocol data unit skipping reporting criterion being satisfied.

13. A radio network node, comprising:

at least one processor configured to process executable instructions that, when executed by the at least one processor, facilitate performance of operations, comprising:

transmitting, to a first user equipment, a packet skipping configuration comprising a packet skipping reporting criterion to be applicable to traffic, corresponding to at least one second user equipment associated with the first user equipment, to be transmitted to the radio network node;

transmitting, to the first user equipment, a configured grant pattern indication indicative of a first configured grant resource pattern usable by the first user equipment to schedule traffic to be transmitted to the radio network node;

receiving, from the first user equipment, a packet skipping report message comprising a failure indication indicative of at least one of the at least one second user equipment with respect to which the first user equipment failed to transmit at least one traffic packet to be transmitted to the radio network node a number of times that satisfies the packet skipping reporting criterion;

responsive to receiving the packet skipping report message, based on the failure indication, determining a second configured grant resource pattern usable by the first user equipment to schedule traffic, corresponding to the at least one second user equipment, to be transmitted to the radio network node; and transmitting, to the first user equipment, an updated configured grant pattern indication indicative of the second configured grant resource pattern.

14. The radio network node of claim 13, wherein the number of times that the first user equipment failed to transmit the at least one traffic packet to be transmitted to the radio network node that satisfies the packet skipping reporting criterion is a first actual number of times, and wherein the determining of the second configured grant resource pattern comprises:

determining at least one quality-of-service parameter metric corresponding to at least one quality-of-service parameter associated with at least one traffic flow corresponding to the at least one of the at least one second user equipment indicated by the failure indication to result in at least one determined quality-of-service parameter metric;

determining that the first user equipment failed to transmit the at least one traffic packet to be transmitted to the radio network node the first actual number of times based on a first time resource or a first frequency resource corresponding to the first configured grant resource pattern being unable to accommodate transmitting of the at least one traffic packet according to the at least one determined quality-of-service parameter metric; and estimating that the second configured grant resource pattern comprises a second time resource or a second frequency resource that corresponds to a second number of times that the first user equipment is likely to fail, according to a threshold likelihood, to transmit at least one traffic packet to be transmitted to the radio network node that is lower than the first actual number of times to result in an estimated second number of times.

15. The radio network node of claim 14, wherein the packet skipping report message is a first packet skipping report message, wherein the packet skipping reporting criterion is a first packet skipping reporting criterion comprising a first value, satisfaction of which results in the first user equipment transmitting the first packet skipping report message, and wherein the operations further comprise:

transmitting, to the first user equipment, a second packet skipping reporting criterion comprising a second value, to be applicable to traffic, corresponding to the at least one second user equipment, to be transmitted to the radio network node, wherein failure to transmit at least one traffic packet, corresponding to the at least one second user equipment, to be transmitted to the radio network node a second actual number of times corresponds to the second packet skipping reporting criterion being satisfied, which is to result in the first user equipment transmitting a second packet skipping report message indicative of the second packet skipping reporting criterion being satisfied.

16. A non-transitory machine-readable medium, comprising executable instructions that, when executed by at least one processor of a radio network node, facilitate performance of operations, comprising:

transmitting, to an extended reality processing unit, a packet skipping configuration comprising a packet skipping reporting criterion to be applicable to traffic, corresponding to at least one extended reality appliance, to be transmitted by the extended reality processing unit to the radio network node;

transmitting, to the extended reality processing unit, a configured grant pattern indication indicative of a first configured grant resource pattern usable by the extended reality processing unit to schedule traffic, corresponding to the at least one extended reality appliance, to be transmitted to the radio network node;

receiving, from the extended reality processing unit, a packet skipping report message comprising a failure indication indicative of at least one of the at least one extended reality appliance with respect to which the extended reality processing unit failed to transmit at least one traffic packet to be transmitted to the radio network node a first number of times that satisfies the packet skipping reporting criterion;

responsive to receiving the packet skipping report message and based on the failure indication, determining a second configured grant resource pattern usable by the extended reality processing unit to schedule traffic, corresponding to the at least one extended reality appliance, to be transmitted to the radio network node; and transmitting, to the extended reality processing unit, an updated configured grant pattern indication indicative of the second configured grant resource pattern, wherein the determining of the second configured grant resource pattern comprises:

determining at least one quality-of-service parameter associated with at least one traffic flow corresponding to the at least one of the at least on extended reality appliance, indicated by the failure indication, to result in at least one determined quality-of-service parameter;

determining that the extended reality processing unit failed to transmit the at least one traffic packet to be transmitted to the radio network node the first number of times based on a first time resource or a first frequency resource corresponding to the first configured grant resource pattern being unable to accommodate transmitting of the at least one traffic packet according to the at least one determined quality-of-service parameter; and determining that the second configured grant resource pattern comprises a second time resource or a second frequency resource that corresponds to a second number of times that the extended reality processing unit is likely to fail, according to a defined failure likelihood criterion, to transmit at least one traffic packet to be transmitted to the radio network node that is lower than the first number of times.

17. The radio network node of claim 16, wherein the at least one quality-of-service parameter is a latency or a traffic volume.

18. The radio network node of claim 17, wherein the second time resource or the second frequency resource is respectively larger than the first time resource or the first frequency resource.

19. The radio network node of claim 17, wherein the second time resource or the second frequency resource is respectively smaller than the first time resource or the first frequency resource.

20. The radio network node of claim 17, wherein the first frequency resource corresponds to a first frequency range, wherein the second frequency resource corresponds to a second frequency range, and wherein the second frequency range is different that the first frequency range.

* * * * *